United States Patent [19]
Carre

[11] 3,855,905
[45] Dec. 24, 1974

[54] HYDRAULIC POWER CONTROL DEVICE

[75] Inventor: Jean-Jacques Carre, Montreuil, France

[73] Assignee: Societe Anonyme D.B.A.

[22] Filed: May 25, 1973

[21] Appl. No.: 364,400

[30] Foreign Application Priority Data
June 12, 1972  France .................... 72.021053

[52] U.S. Cl. .............................. 91/384, 91/391 R
[51] Int. Cl. .............................................. F15b 9/10
[58] Field of Search ............... 91/391 R, 391 A, 384

[56]  References Cited
UNITED STATES PATENTS

| | | | |
|---|---|---|---|
| 2,976,849 | 3/1961 | Stelzer | 91/384 |
| 3,047,341 | 7/1962 | Alfieri | 91/384 |
| 3,610,102 | 10/1971 | Brown, Jr. | 91/391 R |

*Primary Examiner*—Paul E. Maslousky
*Attorney, Agent, or Firm*—Ken C. Decker; William N. Antonis

[57] ABSTRACT

The hydraulic power control device comprises a boost piston whose movements depend on the pressure of fluid contained in an actuating chamber, said pressure being controlled by a distributing valve connected to a pressure fluid source and to a reservoir. The valve is operated by a push rod through the intermediary of a lever connected to a double sensor responsive to the relative movement of the valve and of the boost piston. The lever presents a first end on which the sensor is pivoted and a second end pivotably secured to a sliding pin mounted in housing of the control device.

5 Claims, 1 Drawing Figure

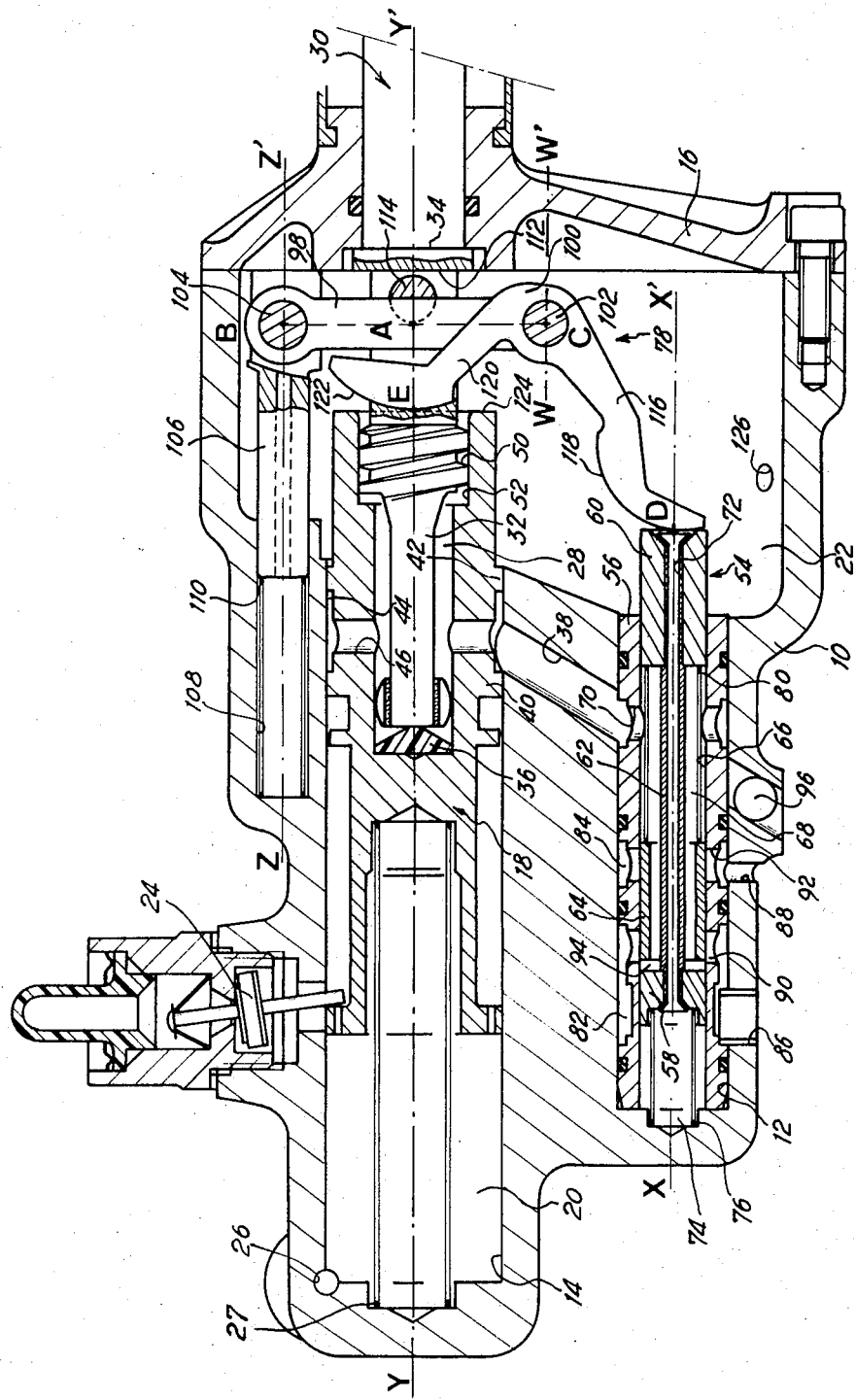

HYDRAULIC POWER CONTROL DEVICE

The invention relates to a hydraulic power control device more particularly to a servomotor for use in a motor vehicle brake system.

They have already been proposed servomotors of the kind having a follower mechanism and comprising inside a body a servo piston whose movements depend on the pressure of fluid contained in an actuating chamber, the said pressure being controlled by a distributing valve connected to a pressure fluid source and to a reservoir, the valve being movable by means of a follower mechanism which acts under the influence of the servo piston and of a push rod capable of moving the servo piston directly in the event of a pressure failure in the actuating chamber.

In a servomotor of this type, the stroke ratio of the input push rod and of the servo piston, which is normally connected to a conventional master-cylinder, is constant and equal to unity during normal assisted operation or in the event of an accidental failure. It is therefore impossible for the designer to reduce the effective stroke of the push rod as desired by users, without making operation of the vehicle brakes extremely difficult in the event of failure of assisted braking.

According to the invention, the follower mechanism comprises a double sensor, cooperating with the servo piston and valve, and a lever on whose first end the sensor is pivoted and whose second end is pivotably mounted relative to the body, the push rod being arranged in the body so as to act on the lever by way of a bearing point situated between the two points at which the lever is pivoted relative to the sensor and to the body.

According to a preferred embodiment of the invention, the second end of the lever is pivoted on a pin slidable relative to the body and resiliently urged into an idle position fixed relative to the body. The structure prevents any deterioration in the follower mechanism in the event of a failure of assisted braking, for example due to jamming of the distributing valve in its housing.

According to a further feature of said preferred embodiment, the supply channel connecting the distributing valve to the actuating chamber is controlled by a valve attached to the pin in such a way that the latter valve is urged into its closing position as soon as the pin is moved out of its idle position. This feature prevents an abrupt return of pressure fluid to the actuating chamber when the distributing valve comes free again.

The invention will now be described by way of example with reference to the accompanying drawing, in which:

The single FIGURE represents a longitudinal section through a servomotor and distributing valve which embody the invention and which are used in a motor vehicle brake circuit.

The servomotor shown in the single FIGURE has a body 10 containing two blind bores 12, 14 which in the embodiment illustrated are parallel. A piston 18 mounted in a fluid-tight manner in the bore 14 defines therein a pressure chamber 20 and an actuating chamber 22 on opposite sides of the piston. The actuating chamber is closed with a cover 16 bolted on to the body 10.

The pressure chamber 20 is replenished with brake fluid through a tilting valve 24 connected to a reservoir (not shown) and it communicates with a first brake circuit through an outlet 26. A return spring 27 urges the piston into the position illustrated in the FIGURE. Persons skilled in the art will readily appreciate that the combination of the bore 14, piston 18 and replenishing valve 24 constitutes a conventional, well-known brake master-cylinder, which will not be described in detail.

The piston 18 contains a cavity 28 which gives on to the actuating chamber, and into which the inner end 32 of a push rod 30 projects. The push rod 30 can slide through the cover 16 in a fluid-tight manner, and in the embodiment illustrated it is coaxial with the piston 18. The push rod is connected in conventional fashion to the brake pedal of the vehicle. A radial annular extension 34 of the push rod can bear on the cover to define the idle position of the rod 30 and piston 18.

A damper pad 36 of elastomeric material is arranged as illustrated between the bottom of the cavity 28 and the end 32 of the push rod.

The body contains a bore 38 connecting the two bores 12, 14. When the piston is in its idle position, the bore 38 leads into the bore 14 between two sealing collars 40, 42 on the piston 18. An annular space 44 between the collars 40, 42 is connected to the cavity 28 by a plurality of ports 46. According to a variant of the invention a seal may be provided on each collar.

Part of the end 32 contains a helical groove 50 coaxial with the long axis of the push rod 30. As the FIGURE shows, the edges of this slot are in contact with the surface of a cylindrical bore 52 formed in the end of the piston 18 and communicating with the cavity 28. The cut-off portion 50 of the push rod and the surface 52 in the piston 18 together define a narrow passage along which fluid can pass between the cavity 28 and the actuating chamber 22.

The supply of pressure fluid is by way of a distributing valve mounted in the bore 12. The valve comprises a movable assembly 54 slidable in a tubular sheath 56 which is inside the bore 12 and which is fixed to the body 10. The provision of the sheath 56 between the movable assembly and the bore makes it possible to use appropriate materials for these components and facilitates machining of them, which is difficult due to the strict manufacturing tolerances.

The movable assembly 54 consists of a slider, comprising two annular bearing members 58, 60 connected by a spacer 62, and of a valve sleeve 64 mounted between the bearing members 58, 60. As the FIGURE shows, the sleeve, which is shorter than the gap between the bearing members 58, 60 and which can therefore move relative to the slider, is biased to abut axially on the bearing member 58 by a prestressed spring 80 abutting on the bearing member 60.

The two bearing members 58, 60 and the sleeve 64 slide in a fluid-tight manner in the bore 66 inside the sheath 56, thereby defining between the two bearing members a supply chamber 68 which communicates with the bore 38 by way of ports 70 provided in the sheath 56. It should be noted that enough space is left between the inside surface of the sleeve 64 and the spacer to enable fluid to flow freely through the sleeve.

The spacer 62 is a tube on to which the bearing members 58, 60 are crimped. The passage 72 inside the tube permits communication between the actuating chamber 22 and the closed portion 74 of the bore 66. Because of this latter feature the slider is completely balanced in respect of the pressures to which it may be subjected.

A spring 76 bearing on the body 10 urges the slider into the idle position shown in the FIGURE, in which it bears on intake controlling means which forms part of a connecting mechanism 78 (described below). Taking the body as a fixed reference, the resilient forces of the two springs are opposite relative to the body.

The sheath 56 is also provided with two annular spaces 82, 84 connected respectively by an outlet 86 and an inlet 88 to a reservoir (not shown) and to a pressure fluid source (not shown), for example an accumulator filled by a hydraulic pump driven by the vehicle's engine. The spaces 82, 84 communicate with the supply chamber 68 by way of ports 90, 92 provided in the sheath 56. The length of the valve sleeve is such that it can cover the two ports very precisely. When the sleeve is in its idle position, as shown in the FIGURE, slight leakage is permitted between the supply chamber 68 and outlet 86. To this end the bearing member 58 contains radial slots 94 enabling fluid to flow between the supply chamber 68 and port 90.

Finally, the sheath 56 is provided with seals on its exterior so that the various parts of the corresponding hydraulic circuit can be suitably isolated, as illustrated. Furthermore the bore 38 is closed with a plug 96, illustrated diagrammatically in the FIGURE.

The connecting mechanism 78, which is of the follower type, consists primarily of a lever 98 and of a double sensor 100 which is pivotable on a pin 102 fixed to one end of the lever 98. The other end of the lever 98 is pivotable on another pin 104 attached to a clevis 106, part of which is slidable in a blind bore 108 provided in the body parallel to the bore 12. A longitudinal bore in the clevis connects the bore 108 to the actuating chamber. A spring 110 biases the clevis 106 on to the cover 16 in a position such as that shown in the FIGURE.

The lever 98 cooperates with the push rod 30 by means of the following arrangement.

As the FIGURE shows, a slot 112 is provided in the push rod 30 between the extension 34 and the helical groove 50. The slot 112 runs longitudinally and passes diametrically through the rod 30. A pivot 114 mounted perpendicularly in the rod 30 contains a central groove to receive the lever 98. To summarize, the lever is introduced into the slot 112 and cooperates with the push rod 30 by way of a rotatable abutment 114. It should be noted that in the embodiment described herein and illustrated in the FIGURE the point of application A of the force transmitted by the push rod 30 is substantially halfway between the two pivot axes B, C of the pins 104, 102. Also, as explained in detail below, the axis B is capable under some circumstances of moving along a straight line ZZ' coplanar with the straight lines XX' and YY', which are the axes of the bores 12 and 14, the line YY' being situated between the other two.

The double sensor 100, seen from the side in the FIGURE, is Y-shaped when viewed along the line XX'. The base of the Y is a rocker 116 which cooperates by way of a cam-forming surface 118 with the bearing member 60 of the movable assembly 54. The contour of the cam surface 118 is such that the point of contact D between the bearing member 60 and rocker 116 remains substantially on the axis XX' during movements of the movable assembly. The two arms of the Y are formed by two other twin rockers 120 which pass round the push rod 30 and which cooperate by way of cam-forming surfaces 122 with an annular shoulder 124 on the end of the piston 18. The contours of the cam surfaces 122 are such that the perpendicular projection (represented by a point E) of the points of contact between the cam surfaces 122 and piston in the plane of the FIGURE remains substantially on the axis YY'. This arrangement reduces very substantially the radial components occurring in the transmission of forces between the sensor 100, piston 18 and movable assembly 54.

In conclusion, the actuating chamber 22 is connected by an orifice 126 to another independent brake circuit in the vehicle. By way of example, the actuating chamber may communicate with the brake circuit for the rear wheel brakes whereas the orifice 26 communicates with the brake circuit for the front wheel brakes of the vehicle. The arrangement may of course be reversed or changed. Moreover, according to a variant (not shown) of the invention, a conventional tandem master-cylinder may be mounted on the body 10 on the left in the FIGURE so that it can be operated by the servo piston.

The servomotor described above operates as follows.

By depressing the brake pedal the driver moves the push rod 30 to the left in the FIGURE. The force exerted by the spring 110 is greater than that exerted by the springs 27 and 76, so that during assisted operation of the servomotor the pin 104 remains stationary relative to the body, in the position illustrated. Due to the action of the push rod 30 the lever 98 pivots about the point B. The piston 18 therefore moves slightly further into the bore 14, closing the tilting valve 24 and taking up the play in the front brake circuit associated with the outlet 26. As soon as the pressure in the chamber 20 becomes appreciable, the end 124 of the piston 18 on which the rockers 120 of the sensor 100 abut becomes fixed relative to the body. The force transmitted by the lever 98 to the point C now causes the rockers 120 to pivot about the point E, and the movable assembly 54 shifts to the left in the FIGURE. Being resiliently connected by the spring 80, the valve sleeve 64 also moves to the left in the FIGURE, closing the port 90 and opening the port 92. The pressure fluid flows into the supply chamber 68 and then enters the actuating chamber by way of the bore 38, ports 46, cavity 28 and narrow passage 50. From the actuating chamber the fluid also supplies the rear brake circuit associated with the orifice 126. The presence of the narrow passage 50 creates a pressure difference between the cavity 28 and actuating chamber 22, which will be discussed in detail below. Nevertheless the pressure rises in the actuating chamber and urges the piston to the left in the FIGURE. The double sensor 100 now pivots anti-clockwise due to the effect of the spring 76, the cam surfaces 122 still bearing on the piston 18. The movable assembly 54 therefore moves to the right in the FIGURE until it reaches an equilibrium position in which the valve sleeve closes the inlet port 92 and outlet port 90, and the point D moves slightly to the left in the FIGURE along the axis XX'. In the embodiment illustrated, this movement is of the order of 1 mm. The pressure now prevailing in the chamber is an equilibrium pressure which, acting on the effective cross-section of the rod 30, generates a proportionate reaction force at the pedal. Assuming that due to operation of the brake pedal the point A has moved a distance L in the direction YY', the point C is therefore moved a distance of about 2 L parallel to this line (taking the circular arc centered on B as identical to its tangent WW'). On the other hand, since the point D has remained substantially stationary relative to its idle position (moving 1 mm to the left), the point E has shifted about $2 \times 2$ L along the axis YY', as the lines XX' and YY' due to the design, are symmetrical relative to the line WW'.

To summarize, for a movement L of the push rod 30, the movement of the piston is equal to $K \times K' \times L$, K being the lever arm ratio BC/AB and K' being the ratio of the distance from XX' to YY' to the distance from YY' to WW'. In the embodiment described, K and K' are equal to 2, but within the scope of the invention the respective positions of the bores 12, 14 and 108 and the dimensions of the lever 98 and sensor 100 may be modified to give the stroke ratio desired by the user.

Between the idle position and the equilibrium position there is a transitory phenomenon due to the presence of the narrow passage 50 between the cavity 28 and actuating chamber 22. At the time of the pressure rise in the actuating chamber the pressure difference depends chiefly on the flow rate. The pressure in the cavity acts on the end of the piston 18 (by way of the damper 36) and on the push rod 30. The principal result is that a reaction at the brake pedal will be felt by the driver as soon as the distributing valve opens. This is because the reaction at the pedal is a function of the static pressure acting on the push rod 30 and of the dynamic pressure created by the rate of flow through the narrow passage 50.

This feature is very useful, particularly in heavy vehicles in which a substantial pressure rise in the brakes is obtainable only by means of a large fluid volume. In servomotors which do not have this dynamic reaction, the reaction at the pedal appears very abruptly and is the fiercer, the further the driver has to press his brake pedal.

It should also be noted that the pressure rise in the actuating chamber 22 is accompanied by corresponding movement of the piston 18 towards the left in the FIGURE, and that since the effective stroke of the piston 18 is greater than that of the rod 30 (four times in the present example), some or all of the helical groove 50 will emerge from the bore 52. The effective cross-section of the narrow passage therefore increases with the advance of the piston, so that the pressure rise in the chamber 22 is not much delayed. Also, in the embodiment illustrated, when the piston stroke is long enough (i.e., at the end of a braking period) the collar 42 covers the mouth of the bore 14. The dimensions of these various components are of course specially adapted to the type of vehicle for which a brake-assisting servomotor embodying the invention is intended.

Furthermore, as indicated above, the pressure difference acts on the damper 36 as long as the dynamic pressure exists. The piston 18 will therefore be urged to the left of the FIGURE before the pressure in the chamber 22 is appreciable. As a result the closing motion of the distributing valve will be brought forward. Operation of the servomotor is then very smooth.

It should also be noted that operation of the brake circuit associated with the orifice 126 is later than that of the circuit connected to the outlet 26. This latter feature can be profitably exploited by motor vehicle designers.

A failure of assisted braking is due chiefly to the following two causes: jamming of the valve sleeve in its bore, and loss of pressure at the inlet 88 due to failure of the pressure source.

If the valve sleeve 64 jams in the bore at the start of or during braking, the force transmitted by the rocker 116 moves the bearing member 58 off the sleeve 64. Also, due to the combination of the force transmitted by the push rod 30 with the resilience of the springs 76 and 80 (now compressed), the clevis 106 is urged into the bore 108, compressing the spring 110. The pin 104 moves to the left in the FIGURE along the axis ZZ'. The push rod 30 comes in contact with the damper 36 and so operates the piston 18, without any risk of damaging the valve or follower mechanism.

To prevent assisted braking from being resumed abruptly due to sudden freeing of the valve sleeve, the bearing member 60 is capable of closing the port 70 during unassisted operation of the piston 18. When the driver releases the brake pedal, of course, the various components of the servomotor return to the idle positions shown in the FIGURE, so that assisted braking is available next time the driver brakes.

In the event of a hydraulic failure, unassisted operation takes place exactly as previously described. When the piston 18 is operated directly by the push rod 30, the ratio between the corresponding movements of these two components is equal to unity. The ratio of the push rod stroke to the piston stroke, which is one-quarter during normal assisted operation of the servomotor described, therefore increases for unasisted operation.

Among other advantages of the distributing valve described above, it is pressure-balanced and therefore does not react appreciably on the rocker 116. Also, only the valve sleeve requires very accurate machining, as slight leakage between the bearing members 58, 60 and the surface of the bore 66 is acceptable (and makes the risk of jamming of the movable assembly very small).

The invention is not restricted to the embodiment described, and in particular it covers variants (not shown) having any of the following features.

The narrow passage 50 is omitted, and the supply to the actuating chamber 22 is made by way of the bore 108, which is connected directly to the chamber 68. The clevis 106 may also act as a safety valve in the same way as the bearing member 60 in the event of a failure of assisted operation due to jamming of the distributing valve.

I claim:
1. In a hydraulic power control device:
  a housing defining an actuating chamber therewithin;
  a servo piston slidably mounted in said housing and responsive to the fluid pressure level in said actuating chamber;
  a distributor valve in said housing controlling communication between said actuating chamber and a fluid pressure source;
  an input rod linearly and slidably mounted in said housing for actuating said distributor valve, said input rod including means for engaging said servo piston for manual movement of the latter upon failure of said fluid pressure source; and a follower mechanism for interconnecting said distributor valve, said push rod, and said servo piston, said follower mechanism including a sensor having a pair of arms, one of said arms cooperating with said servo piston, the other arm cooperating with said distributor valve, a lever, means pivotally mounting one end of said lever on said housing, and means pivotally mounting the other end of the lever on said sensor, said input rod including abutment means for engagement with said lever.

2. The invention of claim 1:

said means pivotally mounting said one end of the lever on said housing including a pin, means mounting said pin for sliding movement with respect to said housing, and resilient means yieldably urging said pin towards a predetermined position with respect to said housing.

3. The invention of claim 2:

said sensor having cam forming surfaces on each of said arms cooperating respectively with said servo piston and with the distributing valve, said means mounting the other end of the lever to the sensor being located between said cam forming surfaces.

4. The invention of claim 1:

said abutment means engaging said lever at a point substantially halfway between the opposite ends thereof.

5. The invention of claim 1:

said push rod and said servo piston being substantially coaxial.

* * * * *